United States Patent [19]

Permenter

[11] 4,204,231

[45] May 20, 1980

[54] CATHODE RAY TUBE WITH LAMINATED PANEL AND METHOD OF MAKING SAME

[75] Inventor: Marvin M. Permenter, Rockford, Ill.

[73] Assignee: Clinton Electronics Corporation, Rockford, Ill.

[21] Appl. No.: 890,612

[22] Filed: Mar. 20, 1978

[51] Int. Cl.² .................................... H04N 5/65

[52] U.S. Cl. .................................... 358/247; 313/477 R

[58] Field of Search .................... 358/247, 245, 254; 315/8; 220/2.1 A, 23 A; 313/473, 476, 477, 478, 479

[56] References Cited

U.S. PATENT DOCUMENTS

| | | | |
|---|---|---|---|
| 3,130,854 | 4/1964 | Casciari | 358/247 |
| 3,311,700 | 3/1967 | Bulcraig | 358/247 |
| 3,614,519 | 10/1971 | Figlewice | 358/245 |
| 3,909,524 | 6/1977 | Sumiyoshi et al. | 358/247 |
| 3,952,152 | 4/1976 | Lill et al. | 358/245 |
| 4,031,552 | 9/1978 | Ohkoshi et al. | 358/247 |
| 4,045,818 | 8/1977 | Wilhelm | 358/245 |

*Primary Examiner*—Benedict V. Safourek

*Assistant Examiner*—Edward L. Coles

*Attorney, Agent, or Firm*—Leydig, Voit, Osann, Mayer & Holt, Ltd.

[57] ABSTRACT

A front panel is temporarily secured to the display face of a cathode ray tube by a piece of double-sided foam tape. The tape holds the panel in forwardly spaced relation with the display face and defines a cell for receiving resin which permanently bonds the panel to the display face.

5 Claims, 3 Drawing Figures

CATHODE RAY TUBE WITH LAMINATED PANEL AND METHOD OF MAKING SAME

BACKGROUND OF THE INVENTION

This invention relates to a cathode ray tube of the type in which a separate front panel is bonded to the display face of the tube. The purpose of the panel is to reduce glare, to enhance contrast and to reduce the danger of injury from shattering glass in the event the tube implodes.

In one known method for securing a panel to the tube, the panel is held so as to be spaced a predetermined distance (e.g., 1/16" to ¼") forwardly from the display face of the tube. A strip of pressure-sensitive tape then is wrapped around the outer peripheries of the tube and the panel to enclose the gap therearound and to cause a closed cell to be defined between the tube and the panel. Thereafter, a clear bonding agent such as polyester resin is injected into the cell and is allowed to cure in order to cement the panel rigidly to the tube. It is necessary to provide vent holes or the like in the tape to allow air to escape from the cell during injection of the resin.

It is important that the spacing between the panel and the tube be uniform across the full area of the panel during curing of the resin. If the spacing is not uniform, the cured resin will be of non-uniform thickness, will undergo differential thermal expansion and contraction, and will cause the panel to separate from the tube.

In the past, there have been a number of ways for establishing the spacing between the panel and the tube prior to application of the tape. For example, the panel may be held in spaced relationship with the tube by a pair of rods placed between the panel and the tube while three sides of the panel are taped, the rods being removed prior to taping of the fourth side. When the fourth side is taped, care must be taken to avoid tilting the panel and changing the spacing.

A second method of spacing involves the placing of four spacer blocks of previously cured resin between the panel and the tube at the corners of the panel. The spacer blocks remain in place permanently and, in some cases, are objectionable from a visual standpoint.

With yet another method of spacing, the panel is fixtured in vacuum cups and is held a predetermined distance from the tube as the tape is applied.

SUMMARY OF THE INVENTION

The general aim of the present invention is to apply a front panel to a cathode ray tube by a new and improved method which is simpler, faster and more economical than prior methods, which insures uniform spacing between the panel and the tube and which automatically allows air bubbles to escape from the resin.

A more detailed object is to achieve the foregoing by utilizing double-sided foam tape to secure the front panel to the tube prior to injection of the resin. The tape, while temporarily securing the panel to the tube, also serves to automatically establish a uniform spacing between the panel and the tube. As the resin is injected, air escapes through the pores of the foam tape and thus air bubbles are prevented from forming in the resin.

The invention also resides in the provision of a unique cathode ray tube made in accordance with the foregoing method.

These and other objects and advantages of the invention will become more apparent from the following detailed description when taken in conjunction with the accompanying drawings.

DETAILED DESCRIPTION OF THE PREFERRED EMBODIMENT

Figure 1:
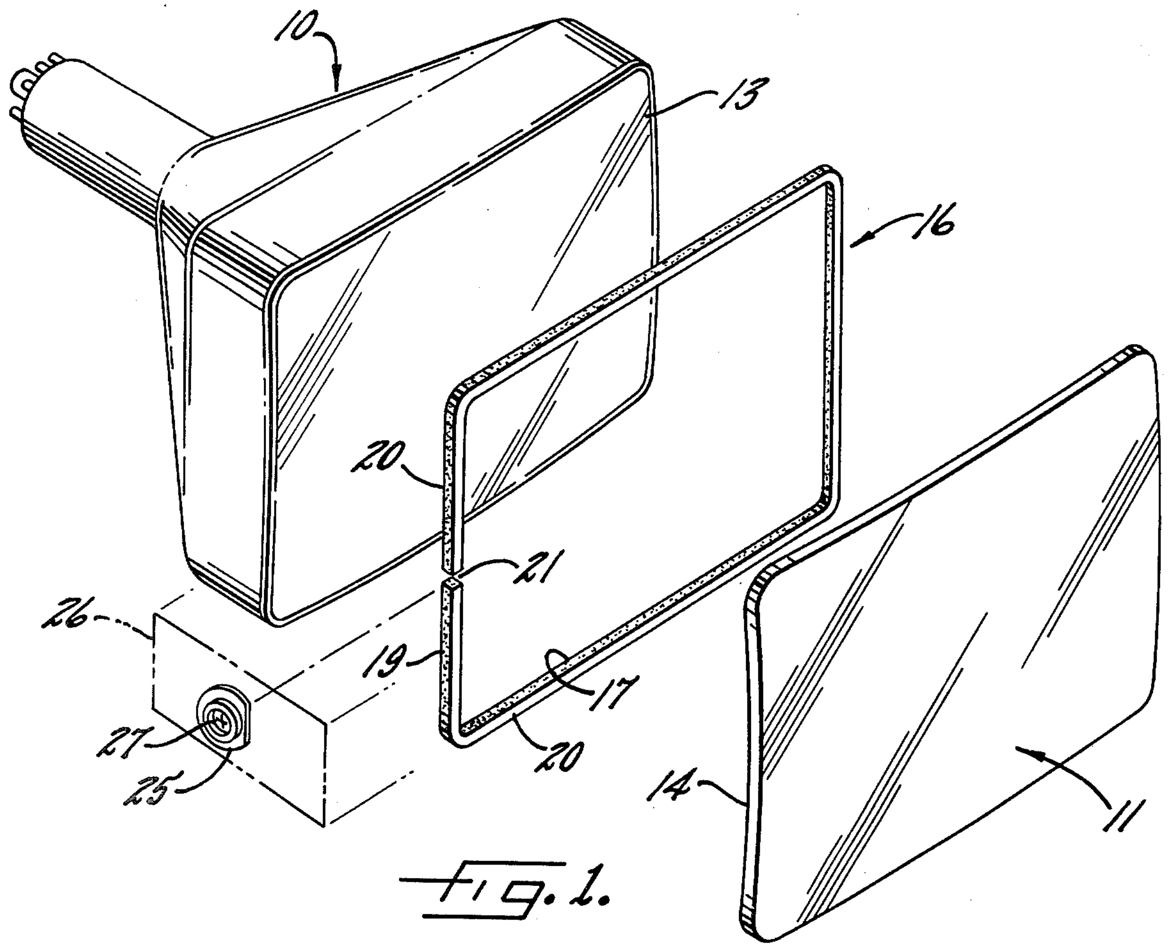
FIG. 1 is an exploded perspective view of the elements, excluding the resin, of a cathode ray tube made in accordance with the invention.

As shown in the drawings for purposes of illustration, the invention is embodied in a cathode ray tube 10 of the type in which a separately formed glass panel 11 is bonded to the front display face 13 of the tube in order to provide implosion protection and to reduce glare and enhance contrast. In this particular instance, both the panel and the display face are substantially rectangular.

Figure 2:
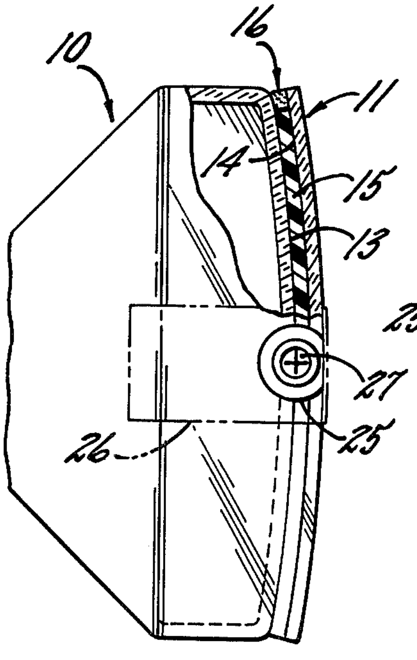
FIG. 2 is a side elevational view of the assembled tube with certain parts being broken away and shown in section.

Typically, the rear side 14 of the panel 11 is concavely curved so as to be complementary with the convex curvature of the glass display face 13 and typically is spaced forwardly from the display face by a distance of between 1/16" and ¼". The panel is cemented to the display face by a clear thermosetting bonding agent such as a layer 15 (FIG. 2) of polyester resin, urethane resin or epoxy resin. The resin layer fills the space between the panel and the display face and has a frontal area which is virtually equal to the area of the rear side of the panel.

To bond the panel 11 to the display face 13, the panel is held in forwardly spaced relation from the display face while the resin, which initially is in liquid form, is introduced into the space between the panel and the display face. The resin is confined within the space and is cured as, for example, by baking the tube 10 in an oven.

It is important that the spacing between all portions of the panel 11 and the display face 13 of the tube 10 be substantially uniform when the liquid resin is applied so that all portions of the cured layer 15 will be of substantially uniform thickness. If some portions of the resin layer are thicker than other portions, the thicker portions will expand and contract to a greater degree in response to temperature changes and ultimately will cause the panel to delaminate or separate from the display face.

The present invention contemplates a new and improved method which involves the use of double-sided tape 16 in order (1) to temporarily secure the panel 11 to the display face 13 (2) to define a cell 17 for captivating the resin between the panel and the display face while the resin cures and (3) to quickly and automatically establish a predetermined uniform spacing between the panel and the display face. By using the double-sided tape 16, the panel 11 may be assembled not only in less time than has been possible heretofore but also with virtual assurance that the panel will be spaced uniformly from the display face so as to eliminate the danger of delamination.

More specifically, the tape 16 has a thickness which is equal to the desired spacing between the panel 11 and the display face 13. Advantageously, the tape which is used herein is a foam tape which may, for example, be a double coated, black urethane tape of the type sold by Minnesota Mining And Manufacturing Corp. under the designation Y4056. Each side of the foam strip 19 is coated with a layer 20 of pressure-sensitive adhesive which initially may be protected by a peel-away backing (not shown).

In carrying out the method of the invention, the tape 16 first is guided around and is pressed against the margins of the rear side 14 of the panel 11 so as to cause the front side of the tape to stick to the panel. The tape thus assumes a rectangular shape similar to the peripheral outline of the panel except, in some instances, a short gap 21 (FIG. 1) is left between the two ends of the tape.

Figure 3:
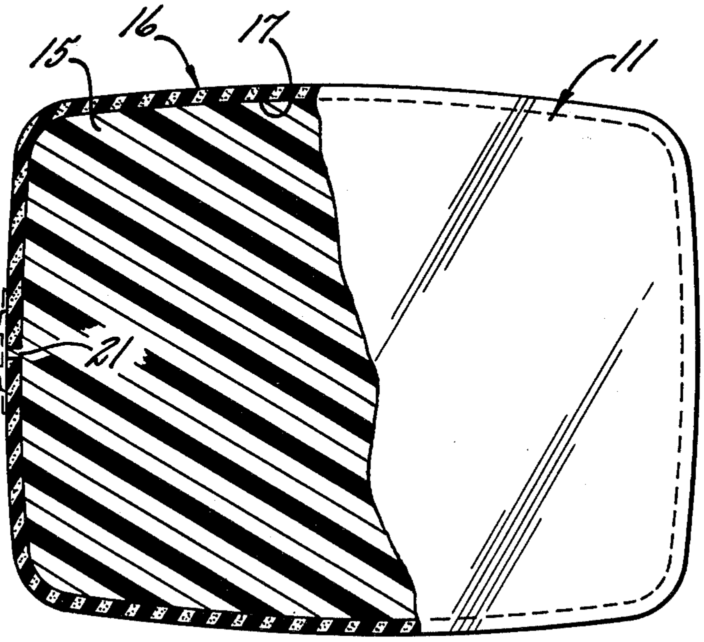
FIG. 3 is a front elevational view of the assembled tube with part of the front panel being broken away and shown in section.

Next, the panel 11 with the attached tape 16 is pressed against the display face 13 to cause the rear side of the tape to stick to the display face. As an incident thereto, the spacing between the panel and the display face is automatically established at a value which is equal to the thickness of the tape. In addition, the tape coacts with the panel and the display face to form a rectangular cell 17 (FIGS. 1 and 3) between the panel and the display face, the boundaries of the cell being defined by the tape. The adhesive of the tape is of such strength that it will hold the panel in a proper position once the panel has been pressed into place.

In some instances, a self-closing valve 25 made of rubber or plastic is placed in the gap 21 between the ends of the tape 16 after the panel 11 has been pressed against the display face 13. The valve may be secured in place by a strip 26 of adhesive tape having a hole for receiving the valve. One suitable type of valve includes a split diaphragm 27 adapted to receive the nozzle of a resin injector and adapted to flex to a closed position after the nozzle has been withdrawn.

When the valve 25 is used, the nozzle of the injector is inserted into the cell 17 through the diaphragm 27 and then liquid resin is injected into the cell to completely fill the latter. As the resin flows into the cell, the air in the cell automatically escapes through the pores of the foam strip 19 so as to eliminate air bubbles which otherwise would form in the resin and without need of providing a separate vent. To advantage, the air can escape through the tape around the entire periphery of the panel and thus there is no danger of localized air bubbles around the periphery as otherwise is the case when a separate vent is used. Also, any excess resin simply escapes through the foam strip.

The valve 25 and the tape 26 may be removed after the resin has been injected into the cell 17 and has partially cured. The tape 16, however, remains as a permanent part of the tube 10.

Instead of using the valve 25, it is possible to butt the ends of the tape 16 together and to inject the resin into the cell 17 with a hypodermic needle. In such a case, the needle of the syringe is inserted into the cell 17 directly through the tape.

From the foregoing, it will be apparent that the present invention utilizes double-sided foam tape 16 to good advantage in assembling a panel 11 to the display face 13 of a cathode ray tube 10. While it is preferred that the tape initially be applied to the panel, it should be recognized that the tape could first be applied to the display face and the panel then pressed against the tape.

I claim:

1. A method for securing a front panel to the front display face of a cathode ray tube, said method comprising the steps of, fastening the rear side of said panel to said display face with a strip of tape having pressure-sensitive adhesive on its front and rear sides, said tape extending around the margins of the rear side of said panel and being sandwiched between the rear side of said panel and said display face, said tape spacing said panel forwardly from said display face and defining a cell between said panel and said display face, introducing a flowable bonding agent into said cell, and allowing said bonding agent to cure.

2. A method as defined in claim 1 in which said panel is fastened to said display face by sticking one side of said tape to said panel and by pressing the panel toward said display face to cause the other side of said tape to stick to said display face.

3. A method for securing a front panel to the front display face of a cathode ray tube, said method utilizing a strip of tape having pressure-sensitive adhesive on each of its sides and comprising the steps of, sticking one side of the tape around the margins of the rear side of said panel, sticking the other side of the tape around the margins of said display face, introducing a flowable bonding agent between the display face and the rear side of the panel, and allowing the bonding agent to cure.

4. A cathode ray tube having a front display face, a front panel spaced a predetermined distance forwardly of and disposed in face-to-face relation with said display face, and a bonding agent disposed in the space between said panel and said display face and cementing the rear side of the panel rigidly to the display face, the improvement in said cathode ray tube comprising, a strip of tape having a thickness equal to said predetermined distance and sandwiched between said display face and the rear side of said panel, said tape extending around said bonding agent and having pressure-sensitive adhesive on its front and rear sides, said pressure-sensitive adhesive securing the front side of said tape to the rear side of said panel and securing the rear side of said tape to said display face.

5. A cathode ray tube as defined in claim 4 in which said tape is formed by a strip of foam having front and rear side coated with said pressure-sensitive adhesive.

* * * * *